US007051272B1

(12) United States Patent
Ten Kate

(10) Patent No.: US 7,051,272 B1
(45) Date of Patent: May 23, 2006

(54) METHOD FOR CODING A PRESENTATION UTILIZING A SUB-PRESENTATION HAVING AN INDEPENDENT PLAY-OUT SPECIFICATION

(75) Inventor: Warner R. T. Ten Kate, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 611 days.

(21) Appl. No.: 09/182,825

(22) Filed: Oct. 29, 1998

(30) Foreign Application Priority Data

Oct. 30, 1997 (EP) ................................. 97203337
Dec. 11, 1997 (EP) ................................. 97203895

(51) Int. Cl.
*G06F 17/00* (2006.01)
(52) U.S. Cl. ...................................... 715/501; 715/513
(58) Field of Classification Search ................ 707/501, 707/513; 345/302, 328, 717, 723; 715/501.1, 715/513, 500.1, 501
See application file for complete search history.

(56) References Cited

U.S. PATENT DOCUMENTS

| 5,680,619 | A | * | 10/1997 | Gudmundson et al. | ......... 717/1 |
|---|---|---|---|---|---|
| 5,748,187 | A | * | 5/1998 | Kim et al. | ................... 345/302 |
| 5,751,281 | A | * | 5/1998 | Hoddie et al. | .............. 345/302 |
| 5,818,435 | A | * | 10/1998 | Kozuka et al. | ............. 345/302 |
| 5,861,880 | A | * | 1/1999 | Shimizu et al. | ............. 345/302 |
| 5,889,514 | A | * | 3/1999 | Boezeman et al. | ......... 345/302 |
| 5,892,506 | A | * | 4/1999 | Hermanson | .................. 345/302 |
| 5,892,507 | A | * | 4/1999 | Moorby et al. | ............. 345/302 |
| 5,898,430 | A | * | 4/1999 | Matsuzawa et al. | ........ 345/302 |
| 5,969,716 | A | * | 10/1999 | Davis et al. | ................. 345/328 |
| 6,064,379 | A | * | 5/2000 | DeMoney | ................... 345/328 |

FOREIGN PATENT DOCUMENTS

FR     2728089     11/1995

OTHER PUBLICATIONS

"ISO-IEC International Standard IS 13522-5 (MHEG) Information Technology—Coding of Multimedia and Hypermedia Information, Part 5: Support for Base-Level Interactive Applications", Nov. 1996.

Chi-Leung et al., "MOCS: An Object Oriented Programming Model for Multimedia Object Communication and Synchronization", International Conference on Distributed Computing Systems.., Volume, Jun. 1994 (Poznan, Poland), pp. 494-501.

* cited by examiner

*Primary Examiner*—Sanjiv Shah
(74) *Attorney, Agent, or Firm*—Larry Liberchuk

(57) ABSTRACT

A coded presentation comprises a number of sub-presentations, each comprising a number of presentation elements. A presentation element is an elementary part that is to be presented and comprises text, audio, video or an image. A sub-presentation has an interface that provides a reference for the presentation elements in that sub-presentation. This reference can relate to timing aspects and to locations aspects relevant during play out, and to a priority as to whether or not the sub-presentation is to be played out.

17 Claims, 5 Drawing Sheets

METHOD FOR CODING A PRESENTATION UTILIZING A SUB-PRESENTATION HAVING AN INDEPENDENT PLAY-OUT SPECIFICATION

BACKGROUND OF THE INVENTION

The invention relates to a method for coding a presentation, the coded presentation comprising at least one presentation element and a play-out specification of the presentation element indicating how the presentation element is to be played out.

The invention further relates to a method for playing out a coded presentation comprising at least one presentation element, in which method the presentation element is played out according to a play-out specification.

The invention further relates to an apparatus for playing out a coded presentation, coded according to the above method for coding a presentation.

The invention further relates to an apparatus comprising a converter module for amending a coded presentation, the coded presentation comprising:
 at least one presentation element, and
 a play-out specification of the presentation element.

The invention further relates to an information carrier comprising a coded presentation, which is coded according to the above method for coding a presentation.

It is known to code a presentation into a description according to a given format. The coded presentation may be transferred via a network or stored in a memory medium for subsequent play out by a suitable apparatus. An example of such a format is the ISO/IEC standard IS 13522-5, better known as MHEG. This standard is described in the document "ISO/IEC International Standard IS 13522-5 (MHEG) Information Technology—Coding of multimedia and hypermedia information, Part 5: Support for base-level interactive applications", November 1996. The presentation may include presentation elements comprising text, audio, video or an image. A presentation element can be regarded as an elementary item that is to be presented. In MHEG, a presentation element is called a Presentable. The coded presentation may include a play-out specification for the play out of a given presentation element. An example in MHEG is where a presentation element somewhere in the presentation may cause the start of another presentation element somewhere else in the presentation. This event-action mechanism provides the author of the presentation with control over the timing of the various presentation elements. So, during play out of a coded presentation, a specific presentation element may be triggered by a running presentation element and the timing behaviour of said specific presentation element is determined on the basis of the direct relation between the running presentation element and that specific presentation element. This causes the problem that the presentation must be executed integrally and that it is very cumbersome to remove a presentation element or substitute it by another one.

SUMMARY OF THE INVENTION

It is an object of the invention to provide a method for coding a presentation of the kind set forth in the opening paragraph, in which the description of the play-out specification is improved. This object is achieved according to the invention in a method that is characterised in that the coded presentation comprises a sub-presentation which comprises the presentation element, and that the sub-presentation is provided with an interface providing a reference for the play-out specification of the presentation element. By grouping the presentation elements into respective sub-presentations, the coded presentation is given an explicit structure which makes it easier to handle it, e.g. to play out the coded presentation. By providing a reference for the play-out specification of its constituting presentation elements, the sub-presentation becomes a self-contained entity with respect to play out. The sub-presentation may be played out autonomously without there being a need to consult other sub-presentations in the presentation. Furthermore, the sub-presentation may be substituted by another sub-presentation having the same interface as far as the provided reference is concerned. The content and the behaviour of the substituted sub-presentation may differ from the content and the behaviour of the original sub-presentation as long as they interact with their environment in the presentation, i.e. through the definition of their respective interfaces, in mutually the same way. Organising the coded presentation into sub-presentations, results in a coded presentation that is simpler to process, e.g. for playback, because the processing apparatus does not need to interpret the whole presentation prior to handling a sub-presentation. This means that the processing apparatus, which may be a consumer playback apparatus, can be designed with a smaller processor and a smaller working memory. At the level of the coded presentation, it is not necessary to know the play-out specification of the various presentation elements. This knowledge can now be specified at the level of the sub-presentation which comprises the particular presentation element.

An embodiment of the method according to the invention is defined in claim 4. By providing the sub-presentation with an interface providing a time reference, the timing specification of its presentation elements may be made relative to that interface. Doing so offers the advantage that the sub-presentation has become a self-contained entity as far the timing behaviour is concerned. The timing issues of the presentation elements can be resolved internally, i.e. without reference to other presentation elements outside the sub-presentation. This means that substituting or removing a presentation element is a relatively easy process because it is not necessary to check the whole of the presentation for broken relations and timing inconsistencies. Furthermore, a sub-presentation may be substituted by another sub-presentation according to the invention, provided that the interface of the two sub-presentations is the same. Also, since the sub-presentation is a self-contained entity, the sub-presentation may be individually played out, separate from the rest of the presentation. This is useful when only a fragment of the presentation is needed or when a part of the presentation is to be verified.

An embodiment of the method according to the invention is defined in claim 5. The start of the presentation element is one of the aspects of the timing behaviour that can be advantageously specified relative to the time reference of the sub-presentation. Apart from the timing specification relative to the time reference, a presentation element may have a further timing specification that is specified relative to another presentation element within the same sub-presentation. For example, the start of a presentation element is specified relative to the time reference of the sub-presentation and the end of that presentation element is specified relative to another presentation element in the sub-presentation.

An embodiment of the method according to the invention is defined in claim 7. By providing a location frame of reference via the interface of the sub-presentation, the location specification of the presentation elements of the sub-presentation may be made relative to that location frame of reference. Then the sub-presentation has become a self-contained entity as far the locations of the presentation elements are concerned. The location issues of the presentation elements can be resolved internally, i.e. without referring to other presentation elements outside the sub-presentation. The location issues concern for example the layered organisation of the presentation elements on a display. To reconstruct which presentation element is to be displayed in front of which other presentation element, their relative layering must be known. Another example is the specification of the window in which the presentation elements are to be displayed.

An embodiment of the method according to the invention is defined in claim 8. By providing the priority for presenting the presentation elements via the interface, the priority is established for the sub-presentation as a whole. In this way, it can be decided during play out whether or not the sub-presentation is to be played out in view of its priority. This is particularly advantageous for play out on a minimal resource platform, i.e. a platform with small processing capacity and a small working memory. If such a platform is not able to completely process the presentation, it can now skip the sub-presentation with the lowest priority. An author preparing a presentation may actively use this priority encoding mechanism to create a presentation that is suitable to be played out on various types of apparatus, each according to its own capabilities. The author assigns to the more important sub-presentations a high priority and to the less important ones a lower priority. A powerful apparatus will play out all sub-presentations whereas a smaller apparatus will skip the sub-presentations that are indicated to be less important.

It is a further object of the invention to provide a method for playing out a coded presentation of the kind set forth with an improved mechanism for determining the play-out specification of a presentation element. This object is achieved according to the invention in a method that is characterised in that that the presentation comprises a sub-presentation which comprises the presentation element, that the sub-presentation comprises an interface providing a reference, and that the presentation element is played out according to the play-out specification relative to this reference. The interface of the sub-presentation provides a reference for the presentation elements in the sub-presentation. This causes the sub-presentation to be self-contained with respect to the behaviour of the presentation elements, and during play out all relations can be resolved internally to the sub-presentation. There is no need to refer to presentation elements outside the currently played out sub-presentation and this greatly facilitates the play out process.

It is a further object of the invention to provide an apparatus comprising a converter module of the kind set forth with an improved mechanism for substituting a sub-presentation. This object is achieved according to the invention in an apparatus that is characterised in that that the coded presentation comprises a sub-presentation which comprises the presentation element, that the sub-presentation comprises an interface providing a reference for the play-out specification of the presentation element, and that the converter module is arranged to substitute the sub-presentation by a further sub-presentation comprising a corresponding interface. This apparatus allows easy substitution of a specific sub-presentation with a sub-presentation comprising a corresponding interface. This can advantageously be used for amending a coded presentation with text presentation elements in one language into a new coded presentation with these text presentation elements in another language.

Further advantageous embodiments of the invention are recited in the dependent claims.

BRIEF DESCRIPTION OF THE DRAWINGS

The invention and its attendant advantages will be further elucidated with the aid of exemplary embodiments and the accompanying schematic drawings, wherein.

Corresponding features in the various Figures are denoted by the same reference symbols.

DESCRIPTION OF THE PREFERRED EMBODIMENTS

Figure 1:
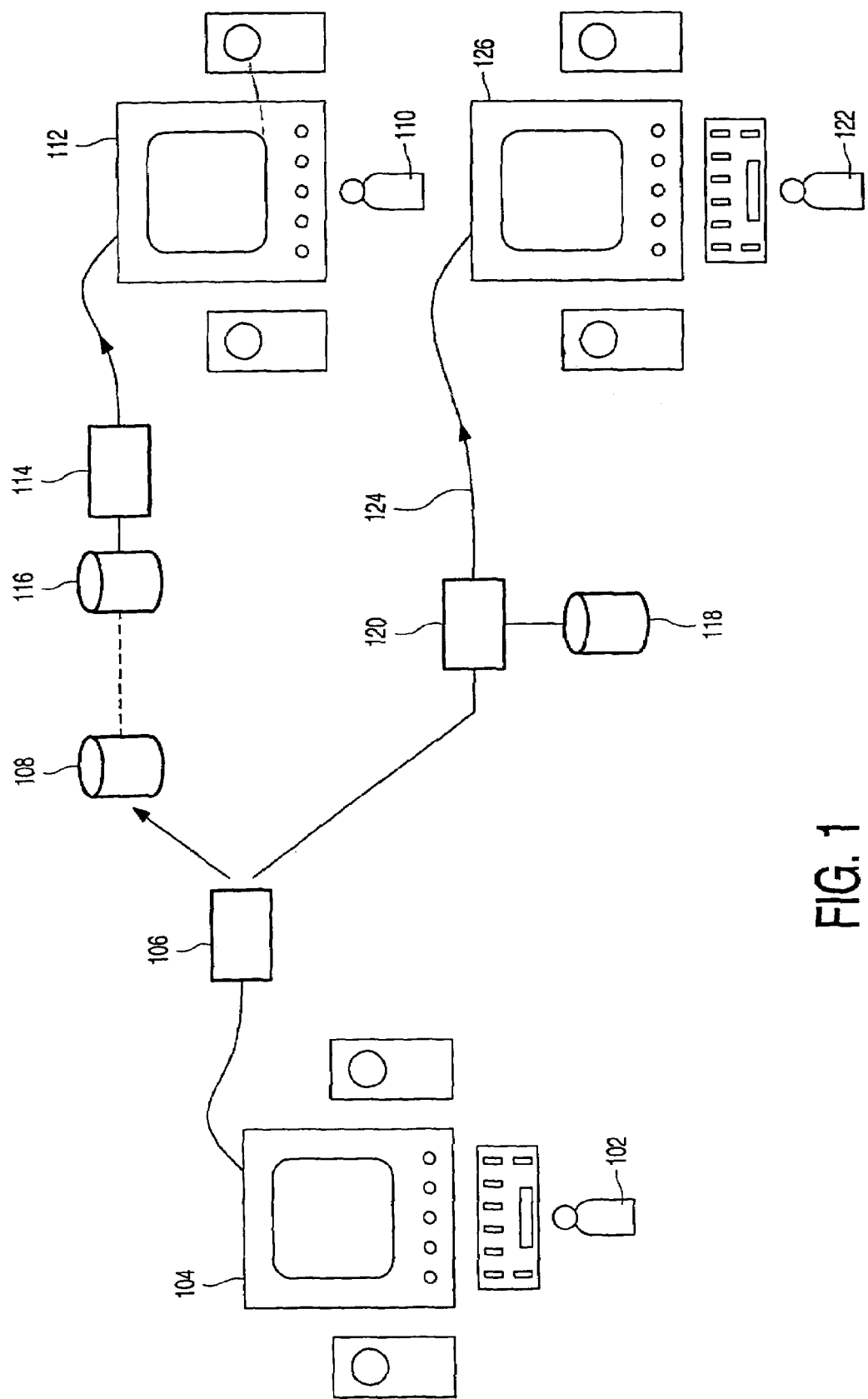
FIG. 1 schematically shows the environment in which the invention is executed, FIG. 2 schematically shows the organisation of presentation elements in a coded presentation according to the prior art, FIG. 3 schematically shows the organisation of presentation elements according to the invention.

FIG. 1 schematically shows the environment in which the invention is executed. An author 102 uses a preparation system 104 to prepare a presentation. The presentation may include text, images, audio and video, which is combined according to the specification of the author. The preparation system 104 generates a coded presentation 106 according to a certain format. The coded presentation 106 is also referred to as a multimedia document, since it may contain a number of different media types. The coded presentation 106 may be stored on an information carrier 108 for subsequent play out and distribution to users. The information carrier may be a CD-ROM, magnetic disk, tape or the like. A user 110 retrieves through a playback apparatus 112 a copy 114 of the presentation from a local copy 116 of the information carrier. If the playback apparatus is not suitable for playback of a presentation in the format used, then a converter may be provided that converts the local copy 114 of the presentation into a format that can be handled by the playback apparatus. Instead of storing the coded presentation 106 on an information carrier, the coded presentation may be stored on the storage device 118 of a server 120. A user 122 may subsequently access the server via a network 124 to play out the presentation on a local station 126. An example of this latter alternative is the use of HTML pages forming a presentation which is put on a server and later accessed by a user via the Internet network.

Figure 2:
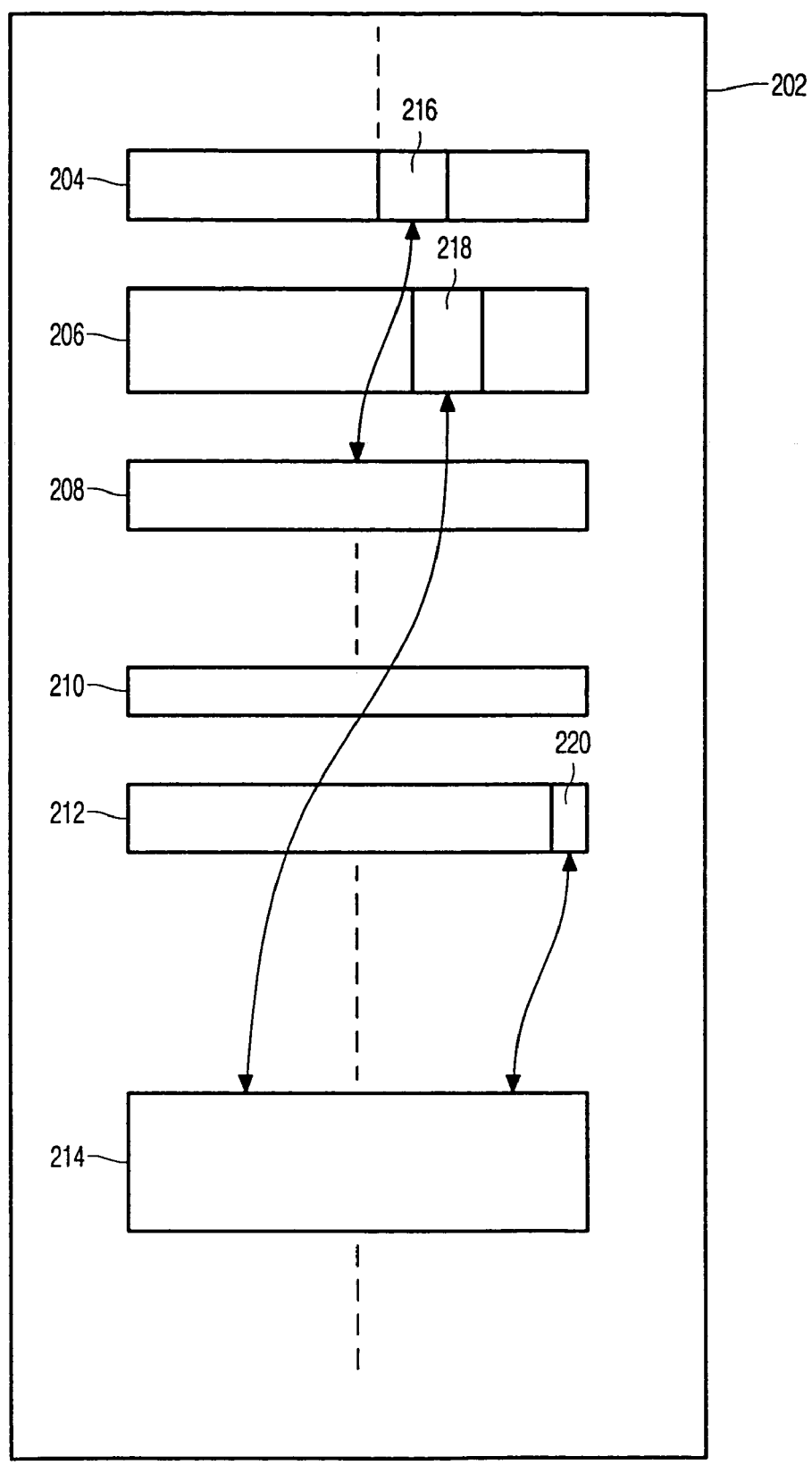

FIG. 2 schematically shows the organisation of presentation elements in a coded presentation according to the prior art. A coded presentation 202 comprises a number of presentation elements, of which are shown presentation elements 204, 206, 208, 210, 212 and 214. A presentation element is an elementary part of the presentation, like a still image or a piece of text, which at a given moment is presented in the presentation. Presentation element 204 comprises an event 216 that triggers the play out of presentation element 208 and presentation element 206 comprises an event 218 that triggers the play out of presentation element 214. Presentation element 212 comprises an event 220 that also triggers the play out of presentation element 214. When a presentation element is running, i.e. being played out at a certain moment its event is executed which causes the play out of another presentation element to start. The newly started presentation element may be presented in addition to the original one, e.g. when a certain point in an audio presentation has been reached the display of an image is started, or it may substitute the original one, e.g. displaying a new image replacing a previously displayed image. Alternative descriptions for this event-action mechanism are synchronisation arc, sync arc and timing specification. According to the prior art, a presentation element may be triggered from anywhere in the presentation and by different presentation elements.

Figure 3:
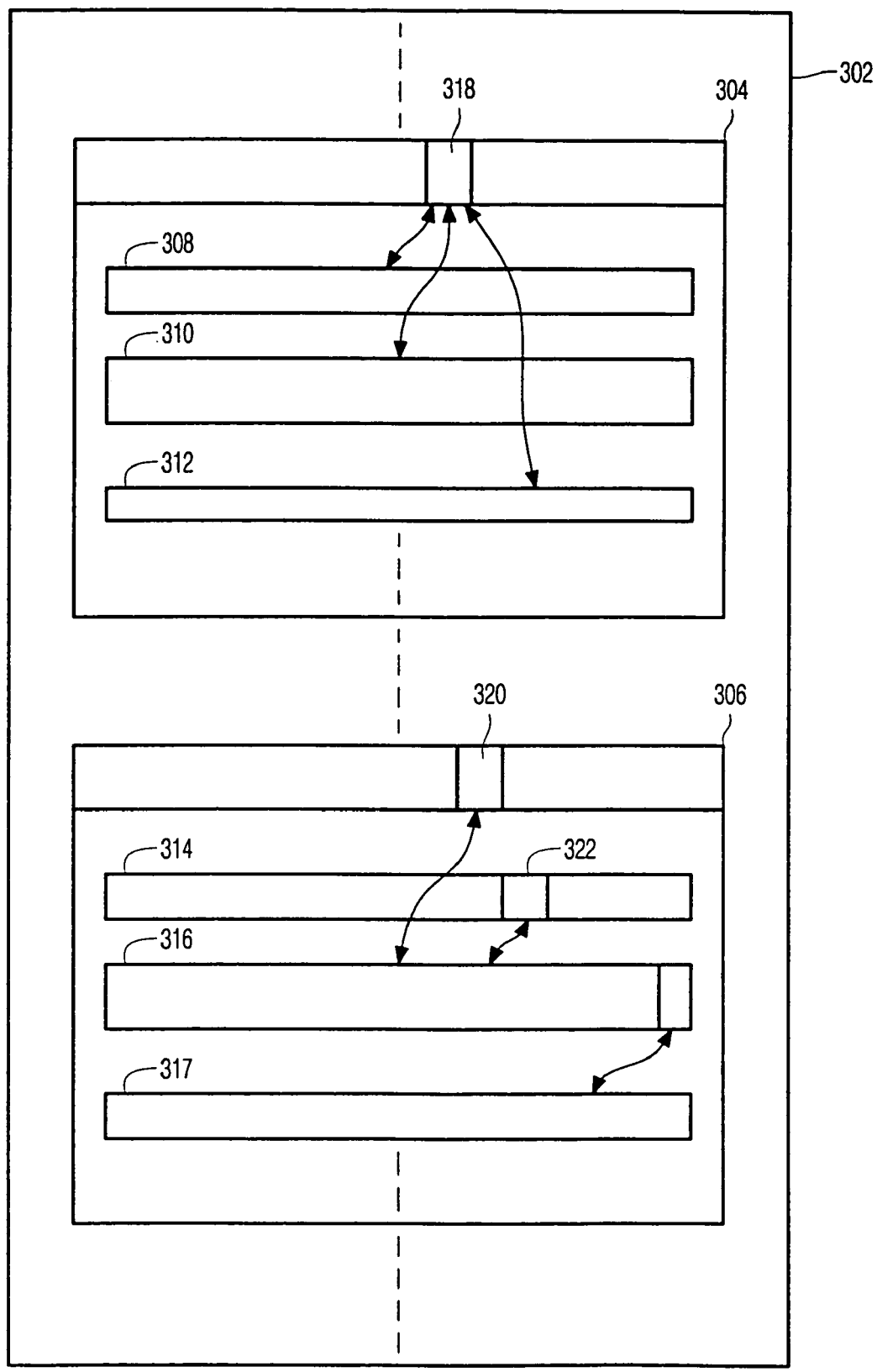

FIG. 3 schematically shows the organisation of presentation elements according to the invention. A coded presentation 302 comprises a sub-presentation 304 and a sub-presentation 306. The sub-presentation 304 comprises presentation elements 308, 310 and 312, and sub-presentation 306 comprises presentation elements 314, 316 and 317.

Sub-presentation 304 comprises an interface 318 which provides a time reference for the whole of the sub-presentation 304. This time reference may provide a point in time from which the starting and end times of presentation elements can be scheduled and it may provide a clock for synchronising the pace of presenting the presentation elements for a specified duration. The timing specification for presentation elements 308, 310 and 312 is specified relative to the time reference of the interface 318. The interface 318 of sub-presentation 304 provides a translation between the time reference valid for the enclosing presentation 302 and the elements of the sub-presentation 304. Sub-presentation 306 has its own interface 320 providing a time reference for that sub-presentation. The timing specification for a presentation element need not be directly related to the interface. Presentation element 317 is specified relative to an event of presentation element 316 of the same sub-presentation. For example, is that presentation element 317 is started when presentation element 316 ends. Furthermore, different aspects of the timing specification may be specified relative to different events. Presentation element 316 is specified for one aspect relative to the interface 320 of the sub-presentation and for another aspect relative to event 322 of presentation element 314. For example, the starting time of presentation element 316 is given relative to the interface 320 and the end time of presentation element 316 is given relative to the event 322 in presentation element 314. However, although in both cases the timing specification is not specified in direct relation to the interface, it is still given within the scope of sub-presentation 306. So all timing issues, such as the start of a presentation element or the verification of the timing in a sub-presentation, can be resolved by merely consulting the sub-presentation and the presentation elements included therein. There is no need to take into account other presentation elements in other sub-presentations. Because of this organisation of the timing specifications, a sub-presentation can be played out separately from the rest of the presentation. This may be useful for testing purposes when certain small changes have been made to the presentation, and it would take excessively long to play out the whole presentation. Furthermore, this organisation allows a complete sub-presentation to be substituted by another as long as the new one has an interface which is compatible with the original one.

A sub-presentation has a structural meaning in that it describes the structure of the presentation in groups of presentation elements. A sub-presentation can further have scheduling information as to the timing of the play out of the presentation elements. The interface of the sub-presentation provides for communication regarding the play-out specification, i.e. the start of a sub-presentation passes information via the interface into the sub-presentation for the play out of the presentation elements. The communication may also be from inside the sub-presentation to the outside of the sub-presentation, i.e. to the enclosing (sub-)presentation. An example is the export of a clock triggered by a presentation element.

Figure 4:
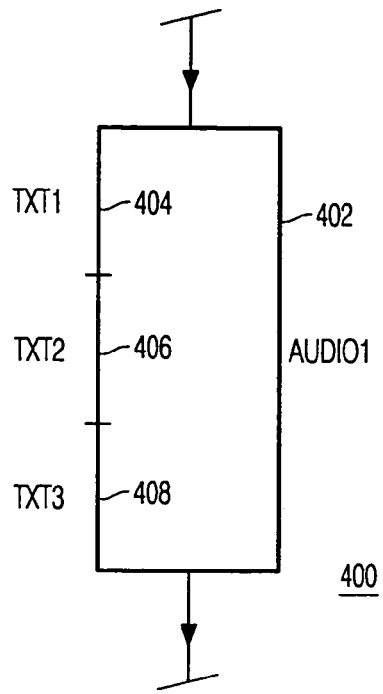
FIG. 4 shows an example of a presentation comprising an audio element and three textual elements.

FIG. 4 shows an example of a presentation comprising an audio element and three textual elements. Presentation 400 comprises the simultaneous presentation of a presentation element 402 called audio1 and a series of three presentation elements 404, 406 and 408, called txt1, txt2 and txt3, respectively. The presentation of the series starts with the presentation of presentation element 404, followed by the presentation of presentation element 406 and ends with the presentation of presentation element 408. In an embodiment of the invention, presentation 400 is coded as follows:

(1) .
(2) .
(3) .
(4) <par>
(5) <audio id = "audio1">
(6) <seq clock = "audio1">
(7) <text id = "txt1" begin = "0">
(8) <text id = "txt2" begin = "10s">
(9) <text id = "txt3" begin = "20s">
(10) </seq>
(11) </par>
(12) .
(13) .
(14) .

Lines 1–3 symbolise that various lines of the coded presentation have been omitted from the example and that only the part corresponding to FIG. 4 has been given. Line 4 defines the beginning of a so-called parallel sub-presentation of sub-presentations and/or presentation elements which are to be presented in parallel, i.e. simultaneously. Line 11 defines the end of that parallel sub-presentation. The parallel sub-presentation of this example contains two parts that are to be presented simultaneously. These are a presentation element defined in line 5 and a sequential sub-presentation defined in lines 6–10. A sequential sub-presentation comprises sub-presentations and/or presentation elements that are to be presented sequentially, i.e. one after the other. The sequential sub-presentation of this example comprises three presentation elements each comprising a text, called txt1, txt2 and txt3, respectively. The presentation element of the parallel sub-presentation comprises an audio piece called audio1, as defined in line 5. Now, in order to define the instant that a particular presentation element of the sequential sub-presentation is to be presented, each such presentation element is given a starting time. In the example, the starting time is 0, 10 and 20 seconds, respectively. In the context of the sequential sub-presentation, the start of a textual presentation element implies the end of the preceding textual presentation element. According to the invention, the starting times of the presentation elements are given relative to the time reference of the enclosing sub-presentation. In line 6, the interface of the sequential sub-presentation specifies that the time reference corresponds to the time reference of the presentation element audio1. This means that the presentation of txt1 starts at the same time as the presentation of audio1. The timing specifications of the presentation elements for txt1, txt2 and txt3 are specified with respect to the interface of the sequential sub-presentation and do not themselves refer directly to the presentation element audio1. This is an important aspect because it ensures that the timing issues of the sequential sub-presentation defined in lines 6–10 can be resolved internally and that no reference outside the sub-presentation need be verified.

An alternative to a coded presentation for the presentation 400 is the following:

(1) .
(2) .
(3) .
(4) <par>
(5) <audio id = "audio1">
(6) <seq clock = "audio1">
(7) <text id = "txt1" dur = "10s">
(8) <text id = "txt2" dur = "10s">
(9) <text id = "txt3" dur = "10s">
(10) </seq>
(11) </par>
(12) .
(13) .
(14) .

In this example, the duration of the period during which the textual presentation elements must be presented is specified. The first textual presentation element starts immediately after the start of the sequential sub-presentation, i.e. at the same time as the start of the audio presentation element, and continues for 10 seconds. Then the second textual presentation element is started, because they are in a sequential sub-presentation which indicates that the presentation elements must be presented sequentially. The duration of the textual presentation elements is given with respect to the time reference of the interface defined in line 6. When this alternative is played out, the result is the same as that of the previous alternative where the starting times of the textual attributes have been specified.

Figure 5:
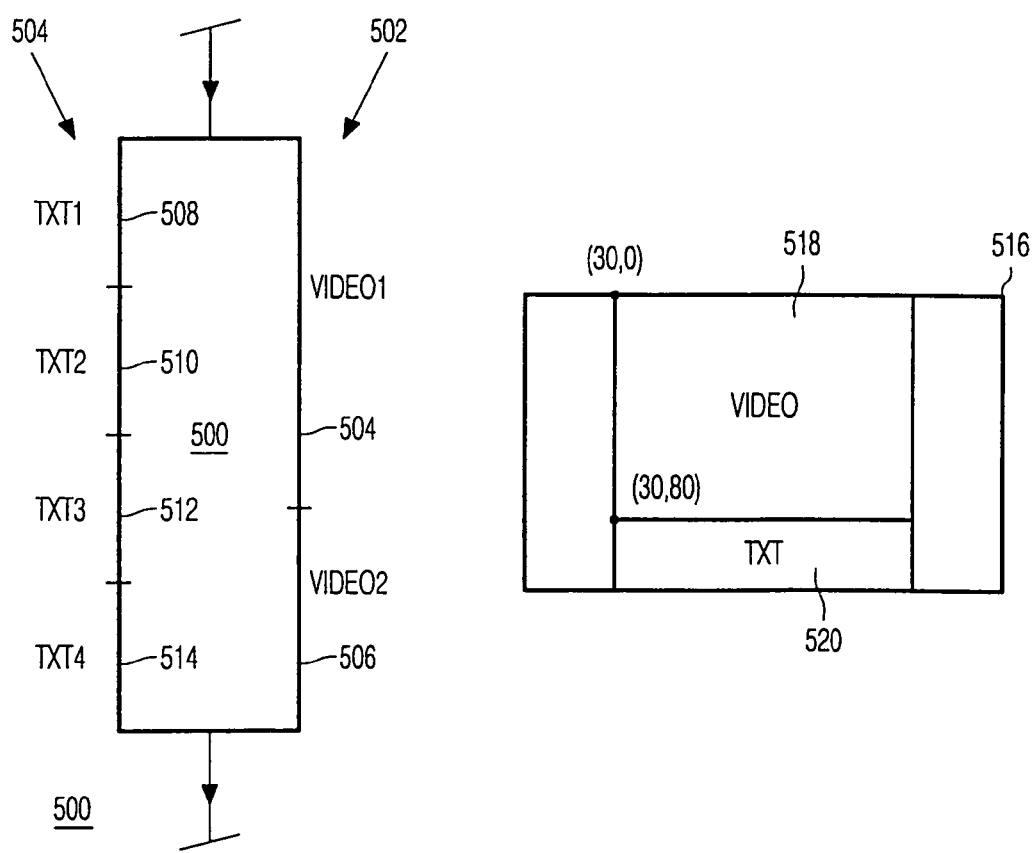
FIG. 5 shows an example of a presentation comprising two video elements and four textual elements.

FIG. 5 shows an example of a presentation comprising two video elements and four textual elements. Presentation 500 comprises the simultaneous display of a video sub-presentation 502 and a textual sub-presentation 504. The video sub-presentation 502 comprises a sequence of video presentation element 504, called video1, and video presentation element 506, called video2. The textual sub-presentation 504 comprises a sequence of textual presentation element 508, called txt1, textual presentation element 510, called txt2, textual presentation element 512, called txt3, and textual presentation element 514, called txt4. The coded presentation corresponding to presentation 500 is:

(1) .
(2) .
(3) .
(4) <par>
(5) <seq id = "seq1" export clock x_origin = "30" y_origin = "0">
(6) <video id = "video1">
(7) <video id = "video2">
(8) </seq>
(9) <seq id = "seq2" clock = "seq1" x_origin = "30" y_origin= " 80">
(10) <text id = "txt1" dur = "10s">
(11) <text id = "txt2" dur = "10s">
(12) <text id = "txt3" dur = "10s">
(13) <text id = "txt4" dur = "10s">
(14)</seq>
(15)</par>
(16) .
(17) .
(18) .

The coded presentation comprises a parallel sub-presentation of a sequential video sub-presentation seq1, defined in lines 5–8, and a sequential textual sub-presentation seq2, defined in lines 9–14. The sub-presentation seq1 has a time reference according to which its presentation elements video1 and video2 are presented. This time reference is available inside sub-presentation seq1, but through the interface defined in line 9 it becomes also available to the enclosing parallel sub-presentation. According to the timing interface of sub-presentation seq2, which is defined in line 9, the time reference exported by seq1 is to be used inside seq2. So the duration of the textual presentation elements of lines 10–13 is synchronised with the presentation of the video presentation elements.

FIG. 5 further shows a display area 516, comprising a frame 518 in which the video presentation elements are to be presented and a frame 520 in which the text presentation elements are to be presented. These frames are defined in the interface of the respective sub-presentation. For reasons of brevity, only the definition of the origins of the frames has been explicitly mentioned in the code presentation above: the origin of the frame 518 in line 5 and the origin of frame 520 in line 9. In this example, a sub-presentation has an interface providing a time reference for its presentation elements and providing a location frame of reference for its presentation elements. Both types of reference cause the sub-presentation to be a self-contained entity that is isolated from the other parts of the coded presentation. As described hereabove, this facilitates the maintenance of a presentation, because substitution of sub-presentations can be executed more easily, and it also facilitates the play out of the presentation, also allowing a separate play out of a sub-presentation.

Figure 6:
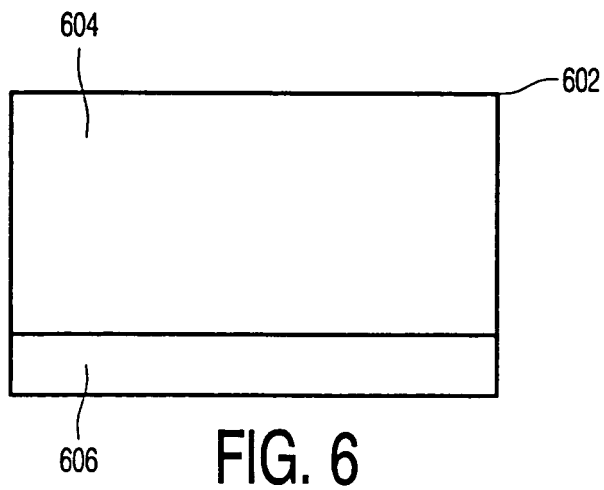
FIG. 6 shows the example of FIG. 5 with modified frames for the sub-presentations.

FIG. 6 shows the example of FIG. 5 with modified frames for the sub-presentations. The structure of the sub-presentations and their presentation elements are the same as in the previous example. Here, display area 602 comprises a frame 604 in which the video presentation elements are to be presented and a frame 606 in which the text presentation elements are to be presented. The coded presentation is as follows:

(1) .
(2) .
(3) .
(4) <par>
(5) <seq id = "seq1" export clock x_origin = "0" y_origin = "0">
(6) <video id = "video1">
(7) <video id = "video2">
(8) </seq>
(9) <seq id = "seq2" clock = "seq1" x_origin = "0" y_origin = "80">
(10) <text id = "txt1" dur = "10s">
(11) <text id = "txt2" dur = "10s">
(12) <text id = "txt3" dur = "10s">
(13) <text id = "txt4" dur = "10s">
(14)</seq>

(15) </par>
(16) .
(17) .
(18) .

This coded presentation results in the same presentation as the previous one, but in somewhat larger frames. Such difference in frames could be used to prepare a presentation for a TV screen with a traditional aspect ratio of 4:3 and a presentation for a wide-screen TV with an aspect ratio of 16:9. The following coded presentation is useful in particular for that purpose:

(1) .
(2) .
(3) .
(4) <par x_origin = "0" y_origin = "0">
(5) <seq id = "seq1" export clock>
(6) <video id = "video1">
(7) <video id = "video2">
(8) </seq>
(9) <seq id = "seq2" clock = "seq1" y_origin = "80">
(10) <text id = "txt1" dur = "10s">
(11) <text id = "txt2" dur = "10s">
(12) <text id = "txt3" dur = "10s">
(13) <text id = "txt4" dur = "110s">
(14) </seq>
(15) </par>
(16) .
(17) .
(18) .

The x_origin defined in line 4 is valid for the whole parallel sub-presentation. This means that changing from wide-screen, as in the coded presentation above, to traditional screen requires only amending line 4 to:
(4)<par x_origin = "30" y_origin = "0">

Then the whole presentation starts at an offset of 30.

Figure 7:
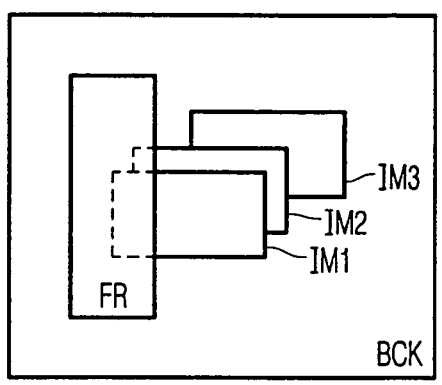
FIG. 7 shows an example of a presentation with images on multiple layers.

FIG. 7 shows an example of a presentation with images on multiple layers. The presentation 700 comprises a background image bck on which all other images are displayed. Furthermore the image comprises a front image fr which is always on top of the other images. Such front image could be used for markers, frame lines, subtitles and the like. The presentation further comprises images im1, im2 and im3, with the following rules for visibility: im1 will be on top of im2 and im3, and im2 will be on top of im3. This organisation of images in various layers is achieved in the following coded presentation:

(1) .
(2) .
(3) .
(4) <par>
(5) <img id = "fr" layer = "3">
(6) <par layer = "2">
(7) <img id = "im1" layer = "5">
(8) <img id = "im2" layer = "3">
(9) <img id ="im3" layer ="1">
(10) </par>
(11) <img id = "bck" layer = "1">
(12) </par>
(13) .
(14) .
(15) .

In the coded presentation, the number of a layer determines which layer is on top of which other layer and consequently which layer is visible at the expense of another. A higher layer number is displayed in front of a lower layer number.

The example comprises a parallel sub-presentation defined in lines 4–12, comprising image fr at layer 3, a parallel sub-presentation of images at layer 2 and image bck at layer 1. This means that image fr is always on top of other images, that image bck is at the back of other images and that the group of images of the sub-presentation is between fr and bck. The parallel sub-presentation of images is defined in lines 6–10 and comprises image im1 at layer 5, image im2 at layer 3 and image im1 at layer 1. It is to be noted that these layer numbers refer to the frame of reference of the sub-presentation, which frame is not available outside the sub-presentation. So the layer numbers indicate the relative position of layers within the sub-presentation, which itself resides at the level of the presentation at layer 2. So, image im1 having local layer number 5 is not on top of image fr having layer number 3 simply because from the perspective of image fr all images of the sub-presentation reside on layer 2. The local layer number is not available at the level of the presentation and cannot be compared with the layer number of image fr.

The examples given refer to a coded presentation with sub-presentations which have an interface providing a time and/or a location frame of reference according to the invention. Sub-presentations may be nested, i.e. a sub-presentation may include another sub-presentation, whereby the included sub-presentation also has such a timing and/or location interface. The concept of interface may also be extended to the coded presentation as a whole. The timing aspects and the location aspects of such a coded presentation are then fully described in the interface. This makes it possible to substitute one coded presentation with another, provided that the interfaces are the same. Furthermore, it is possible then to treat the coded presentation as a sub-presentation and to include a coded presentation in another coded presentation. This may be used for dividing the presentation into two sub-presentations and to offer the user a choice as to which sub-presentation must be played out. Offering this choice may be implemented as presenting the user two still images, representing the respective sub-presentations. A selection by the user of one of the images results in play out of the corresponding sub-presentation. Additionally, the absence of a user selection during a predetermined time may result in the sequential play out of the sub-presentations. Note that the, in this example two, sub-presentations relate to each other as one sub-presentation being contained by the others sub-presentation. The part of the one sub-presentation is not played out if the user/machine selects the other sub-presentation.

Figure 8:
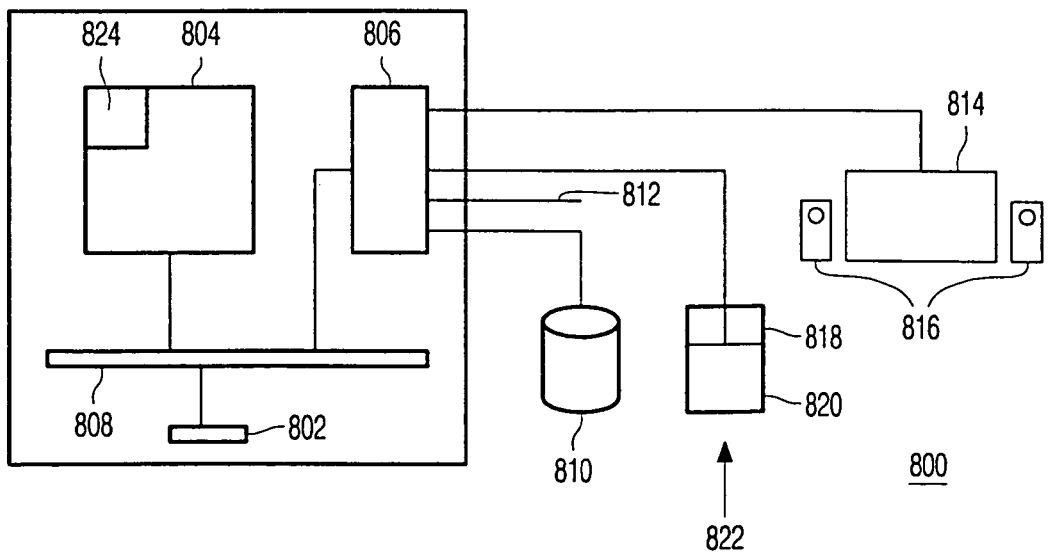
FIG. 8 shows the most important components of the apparatus for playing out a coded presentation according to the invention.

FIG. 8 shows the most important components of the apparatus for playing out a coded presentation according to the invention. The apparatus 800 is implemented according to known architecture and can be realized on a general purpose computer. The apparatus has a processor 802 for carrying out instructions from an application program loaded into working memory 804. The apparatus further has an interface 806 for communication with peripheral devices. There is a bus 808 for exchange of commands and data between the various components of the apparatus. The peripherals of the apparatus include a storage medium 810 containing the executable programs, the coded presentation if this is distributed via a local carrier, and various other data. The storage medium 810 can be embodied so as to include various separate devices which, potentially, may be different kinds of storage devices. Application of the invention is not restricted by the type of device, and storage devices which can be used include optical discs, magnetic discs, tapes, chip cards, solid state devices or some combination of these devices. Furthermore, the apparatus may be connected to a remote server by a network via connection 812. The peripherals of the apparatus further include a display 814, on which the system displays inter alia the visual presentation elements, and speakers 816 for presenting the audible presentation elements. Furthermore, the peripherals may include a selection device 818 and a pointing device 820 with which the user can move a cursor on the display. Devices 818 and 820 can be integrated into one selecting means 822, such as a computer mouse with one or more selection buttons. However, other devices, such as a track ball, graphic tablet, joystick, or touch-sensitive display are also possible. In order to carry out the various tasks, the respective software modules are loaded into the working memory 804.

The apparatus may be provided with a converter module 824 that is capable of substituting one specific sub-presentation with a predetermined sub-presentation. Apart from being incorporated in the playback apparatus, the converter module may be implemented in a stand-alone apparatus whose only function is to substitute the sub-presentation. The substitution may be executed off-line on the coded presentation stored in the storage medium. The result is either the modified coded presentation or a new copy of the presentation containing the amendment. The substitution may also be executed real-time, while the coded presentation is being played out. In this case, the converter apparatus receives the original coded presentation, either from a storage medium or from a network, and outputs a coded presentation containing the amendment. So the converter apparatus may produce as output a coded presentation described in the same format as the coded presentation that the apparatus received as input.

The invention claimed is:

1. A presentation program portion stored on a computer readable medium, said presentation program portion comprising:
    a sub-presentation program segment comprising:
        a presentation element with a play-out specification indicating how the presentation element is to be played; and
        an interface program segment defining a reference timing for the play-out specification, wherein the reference timing is defined independent of the presentation element.

2. The presentation program portion of claim 1, wherein the sub-presentation program segment comprises a sequence of presentation elements which are programmed to be presented one after the other.

3. The presentation program portion of claim 1, wherein the sub-presentation program segment comprises a group of presentation elements which are programmed to be presented simultaneously with respect to each other.

4. The presentation program portion of claim 1, wherein the reference timing specifies the start of the presentation element with respect to the sub-presentation program segment.

5. The presentation program portion of claim 1, wherein the reference timing specifies the duration of the presentation element with respect to the sub-presentation program segment.

6. The presentation program portion of claim 1, wherein the play-out specification includes a location specification specifying a location of the presentation element when presented and wherein the interface program segment provides a location frame of reference relative to which the location specification for the presentation element is specified.

7. The presentation program portion of claim 1, wherein the interface program segment provides a sub-presentation priority specifying a priority with respect to presenting content representative of the sub-presentation program segment.

8. A method for playing out a coded presentation on an electronic presentation device, the method comprising the acts of:
    playing out at least one sub-presentation which comprises the acts of:
        determining a play-out specification for a presentation element based on a timing reference of the sub-presentation that is independent of the presentation element;
        playing out the presentation element in accordance with the play-out specification.

9. An apparatus comprising a converter module for amending a coded presentation, the coded presentation comprising:
    a sub-presentation program segment comprising:
        a presentation element with a play-out specification indicating how the presentation element is to be played; and
        an interface program segment defining a reference timing for the play-out specification, wherein the reference timing is defined independent of the presentation element, wherein the converter module is arranged to substitute the sub-presentation by a further sub-presentation comprising a corresponding interface.

10. An information carrier comprising a coded presentation, said coded presentation comprising:
    a sub-presentation program segment comprising:
        at least one presentation element, having a corresponding play-out specification indicating how the at least one presentation element is to be played; and
        an interface program segment defining a reference timing for the play-out specifications, wherein the reference timing is defined independent of the at least one presentation element.

11. The information carrier of claim 10, wherein the play-out specification includes a timing specification specifying timing behavior of the at least one presentation element and wherein the interface of the sub-presentation provides a time reference relative to which the timing specification for the at least one presentation element is specified.

12. The information carrier of claim 11, wherein the timing specification specifies the start of the at least one presentation element with respect to the time reference of the sub-presentation.

13. The information carrier of claim 11, wherein the timing specification specifies the duration of the at least one presentation element with respect to the time reference of the sub-presentation.

14. The information carrier of claim 10, wherein the play-out specification includes a location specification specifying a location of the at least one presentation element when presented and wherein the interface of the sub-presentation provides a location frame of reference relative to which the location specification for the at least one presentation element is specified.

15. The information carrier of claim 10, wherein the interface of the sub-presentation provides a sub-presentation priority specifying a priority with respect to presenting the sub-presentation.

16. A method for playing out a coded multi-media presentation on an electronic presentation device, the method comprising:

accessing a medium, readable by the device and on which the coded multi-media presentation is stored as a plurality of self-contained, sub-presentation data structures;

selecting at least one sub-presentation data structure from the medium, which data structure comprises at least one play-out specification sub-structure and a plurality of presentation element substructures, referred to by the play-out specification sub-structure;

retrieving at least one play-out specification portion from a first location in the data structure, which play-out specification portion specifies timing behavior of at least one respective presentation element within the data structure; and responsive to the play-out specification, retrieving the at least one respective presentation element from a second location in the data structure.

17. The method of claim 16, comprising accessing a self-contained, sub-sub-presentation data structure from within the sub-presentation data structure, which sub-sub-presentation data structure comprises at least one play-out specification sub-sub-structure and a plurality of presentation element sub-sub-structures.

* * * * *